United States Patent [19]

Miura et al.

[11] Patent Number: 4,775,966

[45] Date of Patent: Oct. 4, 1988

[54] OPTICAL INFORMATION RECORDING APPARATUS WITH ECCENTRICITY CORRECTION CIRCUIT

[75] Inventors: Yoshio Miura; Motoyuki Suzuki, both of Yokohama; Masashi Sasaki, Kamakura, all of Japan

[73] Assignees: Hitachi Video Eng. Corp.; Hitachi Ltd., both of Tokyo, Japan

[21] Appl. No.: 890,326

[22] Filed: Jul. 29, 1986

[30] Foreign Application Priority Data

Jul. 29, 1985 [JP] Japan .................................. 60-165761

[51] Int. Cl.⁴ .............................................. G11B 21/10
[52] U.S. Cl. ..................................... 369/44; 358/342; 360/77
[58] Field of Search .................................. 369/44–46; 358/342; 360/77, 78

[56] References Cited

U.S. PATENT DOCUMENTS

| | | | |
|---|---|---|---|
| 4,205,338 | 5/1980 | Schaefer | 358/342 X |
| 4,365,324 | 12/1982 | Michaelis | 369/44 |
| 4,527,263 | 7/1985 | Nakagawa | 369/46 |

Primary Examiner—Aristotelis M. Psitos
Attorney, Agent, or Firm—Antonelli, Terry & Wands

[57] ABSTRACT

An optical information reproducing apparatus wherein a light spot is projected on a rotary disc on which information is recorded, thereby to reproduce the information recorded on the disc, is provided with detection means to detect an amount of eccentricity of the disc by counting a number of tracks on the disc which the light spot at rest traverses when the disc is rotated by one revolution, and eccentricity correction signal generation means to generate a sinusoidal wave signal whose amplitude is determined by the detected amount of eccentricity and whose period is determined by a rotational period of the disc.

The position of the light spot is controlled in accordance with the sinusoidal wave signal and a tracking control signal.

2 Claims, 5 Drawing Sheets

OPTICAL INFORMATION RECORDING APPARATUS WITH ECCENTRICITY CORRECTION CIRCUIT

BACKGROUND OF THE INVENTION

The present invention relates to an optical information recording and reproducing apparatus in which a light spot is projected on a disc-shaped recording medium (rotary disc), whereby information such as a video signal is recorded or reproduced in the form of the change of any optical characteristic in the medium. More particularly, it relates to a technique according to which, when a track is moving reciprocally in the radial direction of a rotary disc due to the eccentricity of the disc, the same reciprocal motion is separately afforded to a light spot, thereby to facilitate a tracking pull-in operation for the spot.

In the optical information recording and reproducing apparatus as stated above, a rotary disc is used as a recording medium, and an information signal is recorded as a spiral recording locus or concentric recording loci on the rotary disc and is reproduced therefrom.

The concentric recording loci are suitable for the recording of information partitioned every fixed section, such as still picture information, whereas the spiral recording locus is suitable for the recording and reproduction of a continuous signal such as a video signal expressive of motion pictures or an audio signal. The recording locus will also be called 'track' below.

In such information recording and reproducing apparatus, with the intentions of reducing the cost of the recording medium and making the size of the apparatus smaller, the density of recording in the recording medium will tend to become still higher in the future. To the accomplishment of the higher density, narrowing the track for a smaller track width has been more eargerly requested along with shortening a recording wavelength.

As one of problems attendant upon the progress of such narrowed tracks, when the recording medium with recorded information tracks after being detached from the apparatus has been set on the apparatus again, the eccentricity (the deviation between the center of recording and that of rotation) of the set recording medium attributed to a mechanical positional deviation or the plastic deformation of the recording medium attributed to a thermal or dynamical cause occurs to give rise to the deformation of the information track exceeding a track interval. For this reason, unless a tracking control following up the deformed shape of the information track is performed, the track position and the scanning position of reproduction by reproducing means (the scanning position of a light spot) involve a relative deviation in a direction traversing the tracks. Moreover, this deviation comes to fluctuate in magnitude.

Usually, among the deformations which arise in the information tracks, the deformation ascribable to the eccentricity accounts for the majority thereof. In this case, the fluctuation of the deviation magnitude mentioned above develops in synchronism with the rotation of the rotary disc being the recording medium, and the amplitude of the deviation magnitude and the phase of the fluctuating waveform relative to the rotational angle of the disc differ depending upon the set state of the disc.

The deviation magnitude of the information track due to the deformation arises with a value of several tens - several hundred $\mu$m though it depends also upon the precision of the information reproducing apparatus or the disc itself, etc. It becomes one order or two orders greater than the track interval assumed to be about 2 $\mu$m.

In the ordinary reproducing state of the disc, even when the magnitude of the deviation of the track in the radial direction of the disc with respect to the original reference position of the track is continually fluctuating due to the eccentricity of the rotary disc, the light spot is subjected to the tracking control so as to follow up the track, and hence, no problem is posed tentatively.

Meanwhile, it is sometimes wished to rapidly shift the light spot from a certain track position A on the rotary disc to another remote track position B. It is assumed by way of example that information to be obtained after reproducing recorded information at the track position A lie at the track position B spaced far therefrom. In this case, there is also a method in which the light spot is moved under the tracking control while reproducing information from the track position A to the position B. With this method, it takes a long time to arrive at the position B from the position A, and the desired information is obtained late.

If the light spot having performed the reproducing operation at the track position A till then is quickly shifted to the track position B with both the reproducing operation and the tracking control suspended and the reproducing operation is thereafter started at the position B, the desired information will be promptly obtainable.

However, when the reproducing operation with the light spot is to be started at the track position B after the shift, a problem takes place. More specifically, the track position B is not at rest but is continually reciprocating in the radial direction of the rotary disc on account of the eccentricity of the disc. Accordingly, the light spot having been shifted with a target at the reference position of the track position B (the original rest position) cannot immediately approach the track position B because of the continual movement thereof. After the shift, the search for the track position B is started. When the position B has been approached, the tracking control is turned on, whereupon the light spot follows up the track position.

As thus far described, when the rotary disc is not eccentric, the light spot is promptly accessible to the track position B, and it immediately turns on the tracking control. Thenceforth, it can follow up the track position. In contrast, in the case where the rotary disc is eccentric, there has heretofore been the problem that a period of time is required for the access to the track position B, so the desired information is obtained late.

One measure against the problem is a method wherein, as seen in the official gazette of Japanese Patent Application Laid-open No. 56-7247 by way of example, the waveform of a tracking signal in a tracking control corresponding to the distorted shape of an information track is stored beforehand, and reproducing means (a light spot) is subjected to the tracking control with the stored signal so as to depict a locus substantially agreeing with the distorted shape of the information track, thereby to correct the relative positional fluctuation between the reproducing means (the light spot) and the track and to shift a scanning position for reproduction (the position of the light spot) accurately and promptly.

It is premised for this method that the tracking control corresponding to the distorted shape of the information track proceeds reliably. However, when an eccentricity attributed to, e.g., a deviation involved at the setting of a disc is great, the tracking control following up the track distortion fails to proceed in some cases. This leads to the problem that the method has no effect in such cases.

Another problem is that an adverse effect is produced in a case where the waveform of the tracking signal is stored in the state in which the tracking is not normal and where the stored signal is used for the correction.

SUMMARY OF THE INVENTION

The present invention has been made in order to improve the unsatisfactory points of the prior arts as stated above. It is accordingly an object of the present invention to provide an optical information reproducing apparatus in which, according to the real situation of an eccentricity in a disc actually set, a light spot is made promptly accessible to a target track position on the disc, thereby to pull in the subsequent tracking control readily and reliably and to make desired information promptly available.

Next, the principle of the present invention will be described.

FIG. 4A is an explanatory diagram showing the relative positional deviation between an information track IT on a rotary disc and the locus S of a light spot. It is assumed that the center of rotation 0 of the information track IT and the center of rotation 0' of the locus S of the light spot deviate as illustrated in the figure because of the eccentricity of the disc.

Then, as the light spot scans the information track IT, a certain point on the locus S repeats reciprocal motions within a range from a position of $\Delta l_2$ outside the information track IT to a position of $\Delta l_1$ inside the same in the direction of a radius R. More concretely, as seen from FIG. 4B, when note is taken of one point K on the locus S, this point K reciprocates within the range of a distance $l(=\Delta l_1 + \Delta l_2)$ every revolution of the disc.

The waveform of the reciprocation is expressed by a sinusoidal wave as shown in FIG. 5A. The amplitude M of the sinusoidal wave is determined by the distance l in FIG. 4B, and the period thereof is in agreement with the rotating period of the disc. In addition, the distance l can be found by counting the number of times by which the light spot traverses the track in one revolution of the disc. FIG. 5B shows the waveform of a tracking error signal developing when the light spot traverses the track. In this waveform, one cycle (whether it has a longer period or a shorter period) corresponds to one track. Therefore, when the number of cycles during one revolution of the disc is counted, the amplitude M of the sinusoidal wave can be eventually found.

Thus, in case of preparing the sinusoidal wave signal which has the amplitude M and the period equal to that of the rotary disc and oscillating the light spot with this signal so as to reciprocate in the direction of the radius R, the locus S and the information track IT ought to agree without any deviation in FIG. 4A if only the phases of the disc and the light spot agree.

In the state in which the light spot is kept oscillating in this manner, it is accessed from a track position A on the rotary disc to a remote track position B. Then, even if the track position B is rocking (reciprocating), the relative positional fluctuation between the light spot and the track position B is canceled because the light spot itself is rocking in the same aspect, and the light spot can be readily accessed to the track position B. Therefore, the tracking control can be immediately turned on. Thenceforth, the light spot follows up the track. In this way, recorded information as desired can be promptly obtained from the track position B.

The above is the operating principle of the present invention.

BRIEF DESCRIPTION OF THE DRAWINGS

FIG. 4A is an explanatory diagram for elucidating the relative positional relationship between an information track and a light spot locus in the presence of an eccentricity, while

FIG. 5A is a waveform diagram showing an amount of eccentricity, while

DETAILED DESCRIPTION OF THE PREFERRED EMBODIMENT

Now, pertinent arts necessary for understanding the present invention will be explained before the description of one embodiment of the present invention taken with reference to the drawings.

Figure 2:
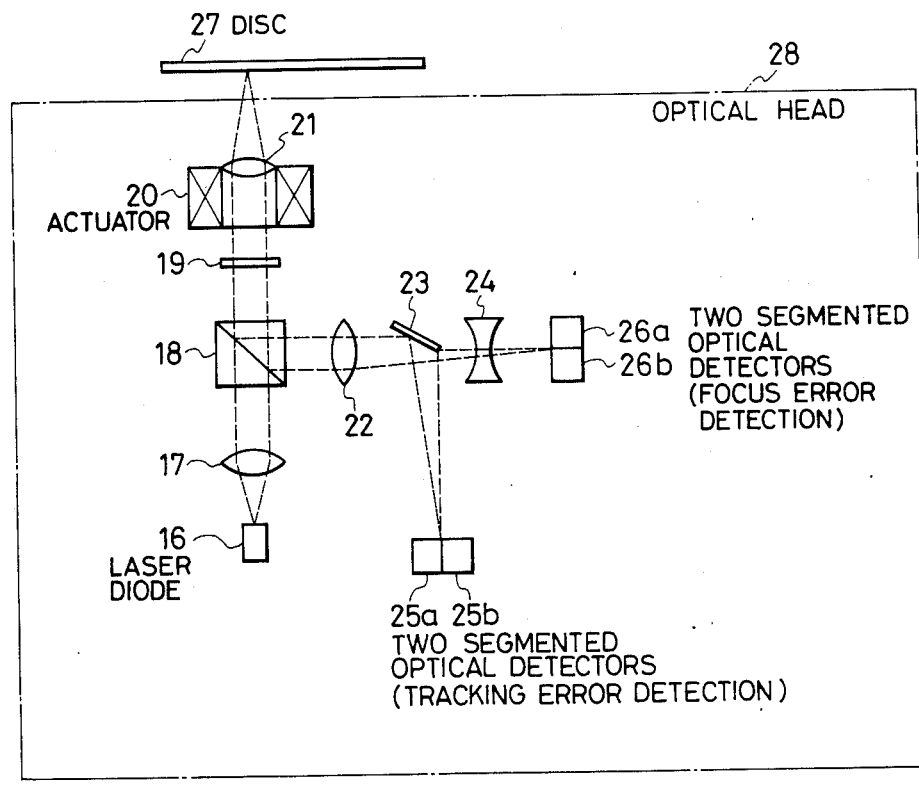
FIG. 2 is an explanatory arrangement diagram showing the arrangement of a conventional optical head.

First, FIG. 2 is an explanatory diagram showing the arrangement of an optical head 28 for recording/reproduction which is used in the present invention. Referring to the figure, a light beam from a laser diode 16 is turned by a collimating lens 17 into a collimated beam, which is passed through a polarizing beam splitter or beam splitting prism 18 and a quarter-wave plate 19 and then focused as a light spot on a disc 27 by an objective lens 21 attached to an actuator 20.

Light reflected from the disc 27 is turned into a collimated beam again by the objective lens 21. After passing through the quarter-wave plate 19, the collimated beam is reflected by the polarizing reflective plane of the polarizing beam splitter 18. The reflected beam passes through a convex lens 22, and is thereafter divided in two by a mirror 23. One of the divided beams enters two segmented optical detectors for detecting a focus error, 26a and 26b through a concave lens 24, while the other enters two segmented optical detectors for detecting a tracking error, 25a and 25b. A focus error detection signal from the two segmented optical detectors 26a and 26b and a tracking error detection signal from the two segmented optical detectors 25a and 25b are led to an I-V (current-voltage) converter circuit in FIG. 3 to be referred to later, and are converted from current signals into voltage signals.

Figure 3:
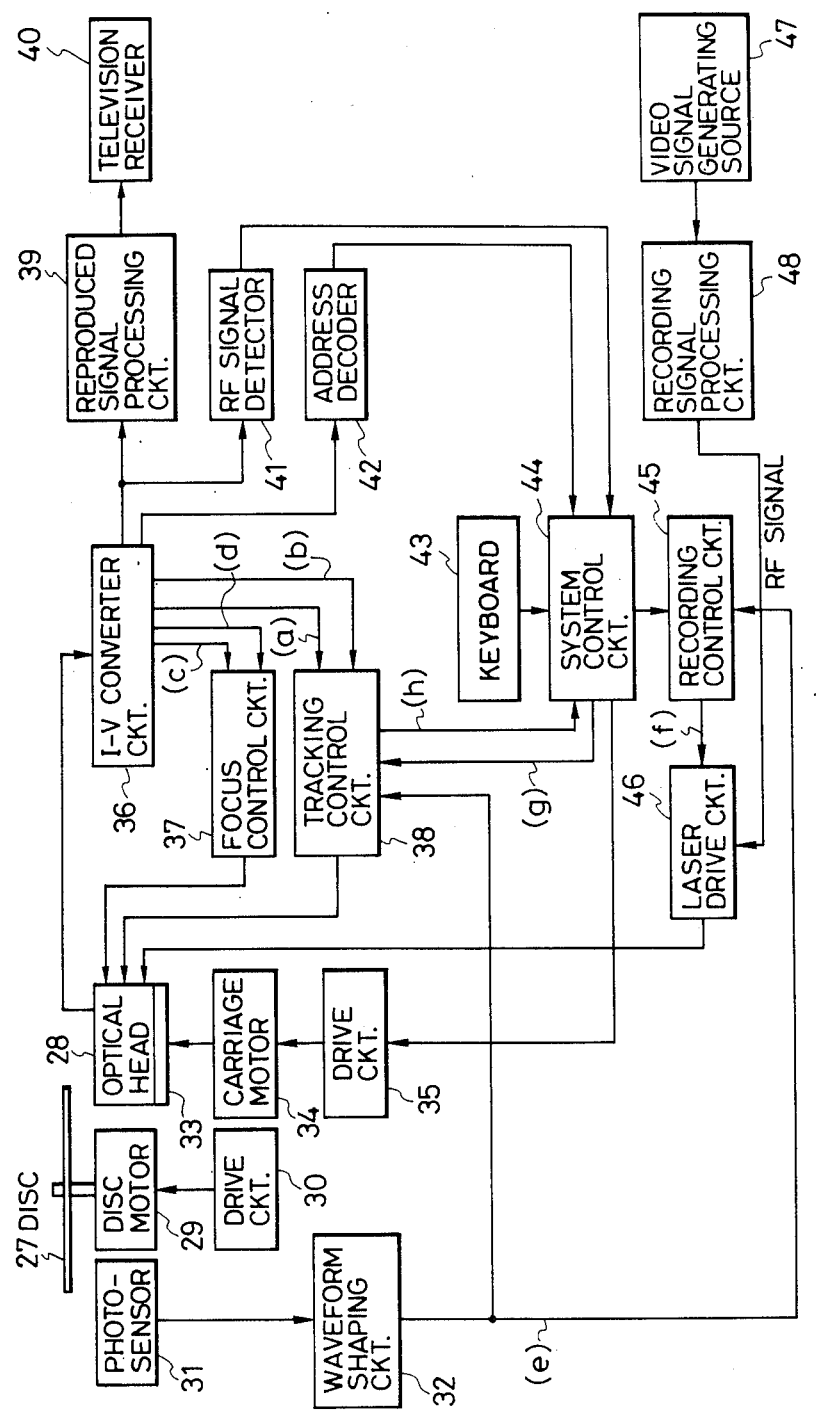
FIG. 3 is a block diagram showing the arrangement of an optical information recording and reproducing apparatus to which the present invention is applied.

Next, FIG. 3 is a block diagram showing an example of an optical recording and reproducing apparatus to which the present invention is applied.

Referring to the figure, numeral 27 designates the disc, numeral 31 a photosensor which serves to detect a recording positioning mark (provided on a disc surface), numeral 32 a wave-shaping circuit, numeral 29 a disc rotating motor, numeral 30 a disc motor driving circuit which controls the disc motor 29 so that one revolution of the disc 27 may correspond to one frame of a video signal, numeral 28 the optical head the details of which are shown in FIG. 2, numeral 33 a carriage on which the optical head 28 is carried, numeral 34 a carriage motor which serves to move the carriage 33 radially of the disc 27, numeral 35 a carriage motor driving circuit, numeral 36 the I-V converter circuit, numeral 37 a focus control circuit, numeral 38 a tracking control circuit, numeral 39 a reproduced signal processing circuit, numeral 40 a television receiver, and numeral 41 an RF signal detector which serves to detect the presence or absence of a reproduced RF signal. Numeral 42 indicates an address decoder, numeral 43 a keyboard for inputting various command signals, numeral 44 a system control circuit constructed of a microcomputer etc., numeral 45 a recording control circuit, numeral 46 a laser drive circuit, numeral 47 a video signal generating source, and numeral 48 a recording signal processing circuit.

A video signal from the video signal generating source 47 is subjected to the frequency modulation by the recording signal processing circuit 48, and is input to the laser drive circuit 46 as an RF signal. While a recording/reproduction switching signal (f) from the recording control circuit 45 is at a high level, the laser drive circuit 46 modulates the intensity of the output beam of the laser included in the optical head 28, in accordance with the input RF signal. The modulated beam is projected on the disc 27, and information is recorded as a variation in the rate of reflection of the laser beam from the disc 27.

In the reproducing mode, the recording/reproduction switching signal (f) from the recording control circuit 45 is made a low level. The laser drive circuit 46 operates to project a light beam of low output of fixed intensity on the disc 27 through the optical head 28. Thus, the recorded information is read out and is converted by the I-V converter circuit 36 into a voltage signal, which is subjected to the frequency demodulation by the reproduced signal processing circuit 39 and is projected as a reproduced picture on the TV receiver 40.

With the above as preliminary knowledge, the embodiment of the present invention will now be described.

Figure 1:
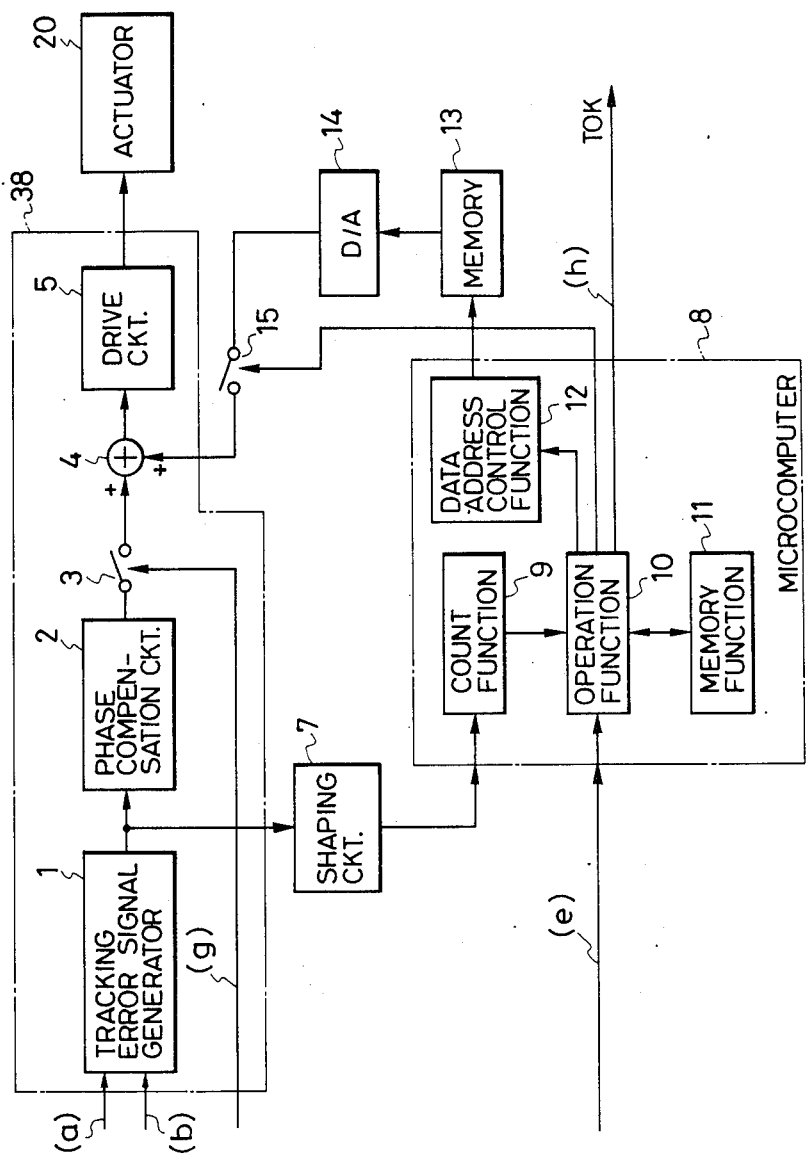
FIG. 1 is a block diagram showing the essential portions of an embodiment of the present invention.

FIG. 1 is a block diagram showing the essential portions of one embodiment of the present invention. In the figure, a tracking control circuit 38 corresponds to the tracking control circuit 38 in FIG. 3, and an actuator 20 corresponds to the actuator 20 in FIG. 2.

Referring to FIG. 1, the tracking control circuit 38 is constructed of a tracking error signal generator 1, a phase compensation circuit 2, a switch 3, an adder 4 and a drive circuit 5.

Subjoined to the tracking control circuit 38 is an eccentricity correction signal generator which is constructed of a shaping circuit 7, a controlling microcomputer 8, a memory 13, a D/A converter 14 and a switch 15.

Using signals for the tracking control, (a) and (b) delivered from the I-V (current-voltage) converter circuit 36 in FIG. 3, the error signal generator 1 produces the so-called S-shaped tracking error signal corresponding to the positional deviation between the light spot and the information track and provides it. This tracking error signal is applied to the actuator 20 through the phase compensation circuit 2, switch circuit 3, adder 4 (a quantity to be added will be described later) and drive circuit 5. Thus, the tracking control hitherto well known is performed so that the light spot may always reproduce an identical information track on the rotary disc. When the switch 3 is turned off, the tracking control is, of course, turned off.

Now, the operation of the eccentricity correction signal generator which is directly pertinent to the present invention will be described.

When the tracking control is turned off by turning off the switch 3, naturally a deviation arises between the locus of the light spot and the information track in accordance with the magnitude of eccentricity of the rotary disc.

Figure 4A:
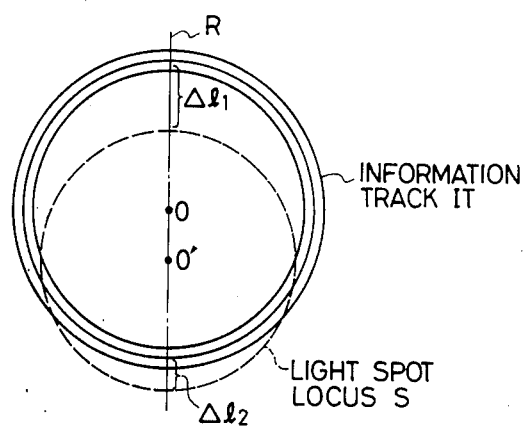
Figure 4B:
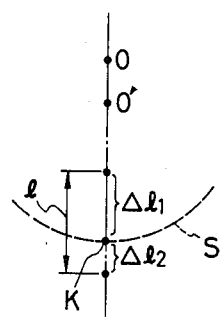
FIG. 4B is an explanatory diagram showing the magnitude of the amplitude of eccentricity vibrations in that case.
Figure 5A:
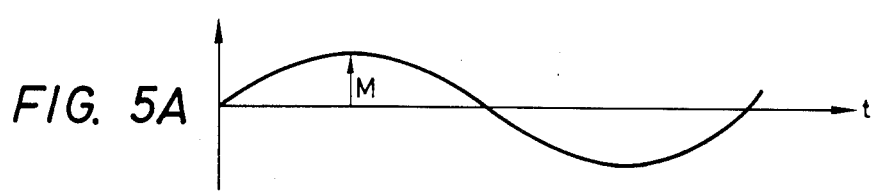

FIG. 4A referred to before will be referred to again. The figure shows the locus of the light spot exhibited when the tracking control is turned off in this manner. In this figure, as stated before, O denotes the center of recording of the information track while O' denotes the center of rotation of the disc, and the solid line indicates the information track IT while the broken line indicates the locus S of the light spot. Assuming the rotational speed of the disc 27 to be 1800 r.p.m., the oscillating waveform of the reciprocations of the light spot in the radial direction of the disc as caused by the eccentricity of the disc is expressed as shown in FIG. 5A. The repetition frequency of the reciprocations is 30 Hz, and the amplitude M expresses the magnitude of the eccentricity.

Figure 5B:
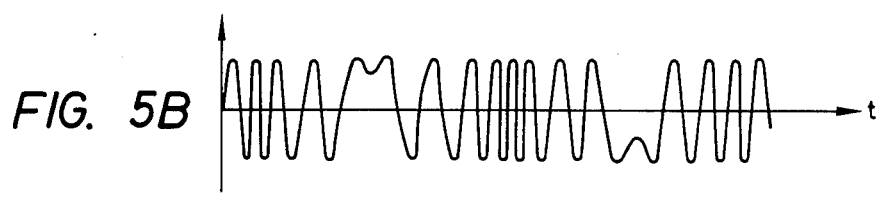
FIG. 5B is a diagram showing a tracking error signal.

FIG. 5B shows the output waveform of the error signal generator 1 in FIG. 1 at this time. Sinusoidal waves (a waveform per period is reckoned as unity) in a number equal to the number of times by which the light spot traverses the information track are obtained. That is, one cycle of the sinusoidal waveform corresponds to the track pitch of the information track, and the magnitude of eccentricity of the disc (the amplitude indicated at M in FIG. 5A) can be detected by counting the number of the sinusoidal waveforms.

In the arrangement of FIG. 1, the switch 15 is first turned off to establish the state in which an eccentricity correction signal to be described later is not applied to the actuator 20 through the adder 4 as well as the drive circuit 5. The switch 3 is also turned off by a signal (g) from the system control circuit 44, so as to render the tracking control inoperative. The waveform shown in FIG. 5B, provided from the tracking error signal generator 1 on this occasion is shaped by the wave-shaping circuit 7 into a well-defined rectangular waveform. The signal of this rectangular waveform is input to the microcomputer 8.

The microcomputer 8 is constructed of a count function 9, an operation function 10, a memory function 11 and a data address control function 12. The microcomputer 8 is also supplied with a signal (e) which is produced in such a way that the recording positioning mark on the surface of the disc 27 is detected through the photosensor 31 and that the detection signal is shaped by the wave-shaping circuit 32, namely, a pulse signal (e) which is output once per revolution of the disc. The number of the output pulses (rectangular waves) from the shaping circuit 7 as received during one revolution of the disc in synchronism with the pulse signal (e) is counted by the count function of the microcomputer 8. It has been stated before that the amount of eccentricity $\delta_1$ of the disc (corresponding to the amplitude M in FIG. 5A) is calculated from the counted result.

Subsequently, the amplitude is determined from the amount of eccentricity $\delta_1$. A sinusoidal wave signal whose period is equal to the rotational period of the disc is prepared by the operation function 10, and is written into the memory 13 by the use of the data address control function 12. The read output of the sinusoidal wave signal is converted by the D/A converter 14 into an analog signal, which is thereafter applied as the eccentricity correction signal to the adder 4 through the switch 15.

Figure 6:
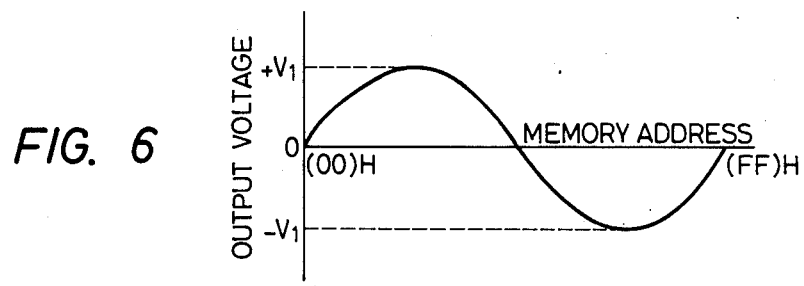
FIG. 6 is a waveform diagram for elucidating an example of the stored content of a memory in the case where the present invention is performed.

The required amplitude $V_1$ of the eccentricity correction signal to be delivered from the D/A converter 14 becomes:

$$V_1 = (\delta_1/g_m\alpha) \qquad (V)$$

where $g_m$ (A/V) denotes the voltage-current conversion coefficient of the drive circuit 5, $\alpha$ ($\mu$m/A) the sensitivity of the actuator 20, and $\delta_1$ the amount of eccentricity. The amount of eccentricity $\delta_1$ and the amplitude V of the eccentricity correction signal fall into the proportional relationship. Accordingly, the digital waveform is prepared by the operation function 10 and is written into the memory 13 in advance by the use of the data address control function 12 in order that, when the output of the memory 13 is converted by the D/A converter 14, the converted output may become a sinusoidal wave as shown in FIG. 6, the amplitude of which is $V_1$ and the period of which is equal to the rotational period of the disc.

Next, the waveform of the eccentricity correction signal which is read out of the memory 13, is D/A-converted and is applied to the actuator 2 via the adder 4 as well as the drive circuit 5 needs to agree in point of phase with the reciprocal oscillating waveform of the track position in the radial direction of the disc as caused by the eccentricity. Unless they agree, an adverse effect arises.

In order to bring the phases of both the waveforms into agreement, the phase of the waveform read out from the memory 13 may be controlled so as to reduce the number of the rectangular waves (this number is zero in perfect agreement) by counting the number of the output rectangular waveforms delivered from the wave-shaping circuit 7 when the eccentricity correction signal is applied to the actuator 20.

Therefore, the switch 15 is kept turned on with the switch 3 kept turned off, to permit the microcomputer 8 to successively provide data for one period of the waveform from the memory 13, from any desired memory address position (namely, while changing the phase) by the use of the data address control function 12 in synchronism with the pulse signal (e) generated every revolution of the disc.

The data read from the memory 13 is D/A-converted by the D/A converter 14, the actuator 20 is oscillated with the resulting analog signal, and the output of the shaping circuit 7 (the number of the rectangular waves) on that occasion is counted by the count function 9 of the microcomputer 8.

Of course, the memory 13 is subjected to an address control so that the sinusoidal wave of one cycle per revolution of the disc may be always output.

The start address in the case of reading out the data from the memory 13 is changed by the data address control function 12 so that the counted values each corresponding to one revolution of the disc may decrease in succession and until the counted value becomes close to the value of a target number (ideally, zero) set by the memory function 11 of the microcomputer 8. Thus, the reading start address of the memory 13 with reference to the signal (e), in turn, the optimum phase of the output signal from the D/A converter 14 is found.

Figure 7A:
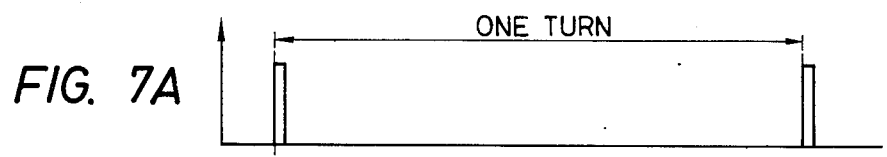
FIGS. 7A, 7B and 7C are timing charts of waveforms at parts in FIG. 1.
Figure 7B:
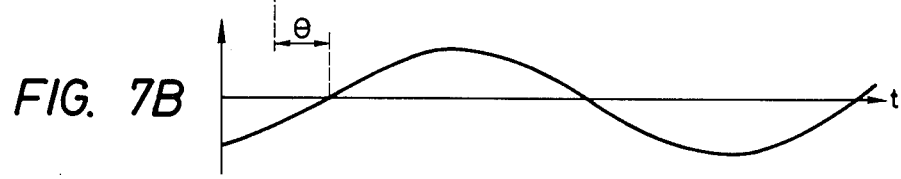
Figure 7C:
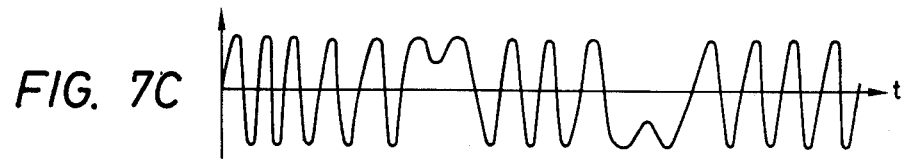

FIGS. 7A–7C show the relationship of the signals of the respective parts in this case. FIG. 7A illustrates the waveform of the output of the wave-shaping circuit 32 in FIG. 3, namely, the pulse signal (e) with one pulse being provided per turn or revolution of the disc. FIG. 7B the waveform of the eccentricity correction signal output from the D/A converter 14, and FIG. 7C the output waveform of the error signal generator 1 (FIG. 1).

When a phase angle $\theta$ in FIG. 7B is properly selected, the number of sinusoidal waves shown in FIG. 7C decreases. When it has decreased to a predetermined number, the phase angle $\theta$ at that time is set as the optimum phase angle of the eccentricity correction signal.

When, in this way, the address control of the data address control function 12 for the memory 13 has been performed so as to provide the optimum eccentricity correction signal from the D/A converter 14, the microcomputer 8 supplies the system control circuit 44 with a TOK signal (h) on the ground that the optimum eccentricity correction signal has been obtained.

In response to the TOK signal, the system control circuit 44 turns on the switch 3 so as to apply the tracking control signal to the adder 4.

The method for finding the optimum phase is not restricted to the foregoing one, but it may well a method wherein with reference to the signal (e), the start address of writing data into the memory 13 is gradually changed, whereupon the address at which the count value of the rectangular waves provided from the shaping circuit 7 becomes the smallest is detected, or a method wherein a rough target value is determined at first, the smallest value being thereafter found.

In the ordinary recording/reproducing state of the rotary disc after the optimum eccentricity correction signal has been obtained as described above, both the switches 3 and 15 are turned on by the system control circuit 44 and the microcomputer 8, and the eccentricity correction signal delivered from the D/A converter 14 and the tracking control signal delivered from the phase compensation circuit 2 are added by the adder 4, the sum being applied to the drive circuit 5 so as to drive the actuator 20.

At this time, the eccentricity correction signal is controlled by the data address control function 12 of the microcomputer 8 so as to be always output as the sinusoidal waveform of one cycle per revolution of the disc and to be output as a signal continuous in time.

As described above, according to the present invention, even in a case where a distortion has appeared in an information track on account of, e.g., the set condition or deformation of a rotary disc being a recording medium, the influence of an eccentricity attributed to the distortion can be eliminated. In information retrieval, jump scanning, etc., therefore, it becomes possible to quickly and accurately shift a light spot to a target track position and to turn on a tracking control immediately after the shift, thereby causing the light spot to follow up the track. This brings forth the advantage that information recorded in the target track position can be promptly obtained.

In performing the present invention, any complicated adjustment is not necessary, and the addition of any expensive device is not necessary, either.

The foregoing embodiment has been described as to the system in which the eccentricity correction signal is applied to the tracking actuator. However, this is not restrictive, but the same purpose can be achieved with, for example, a contruction in which the whole optical head is driven by the eccentricity correction signal.

What is claimed is:

1. An optical information reproducing apparatus wherein a light spot is projected on a rotary disc on which information is recorded, thereby to reproduce the information recorded on the disc, comprising:

eccentricity detection means including means for counting the number of tracks on the disc which the light spot at rest traverses when the disc is rotated by one revolution and for detecting an amount of eccentricity on the disc on the basis of the counted result;

means to generate data representing a sinusoidal wave signal whose amplitude is determined on the basis of the detected amount of eccentricity and whose period is determined according to a rotational period of the disc;

data storing means for storing the data representing the sinusoidal wave signal; and means for controlling a position of the light spot in response to the sinusoidal wave signal obtained from data read out from the data storing means;

wherein said eccentricity detecting means includes means for counting a number of tracks on the disc which the light spot traverses during one revolution of the disc for every revolution of the disc when the disc is rotated and when the light spot is oscillated in a direction orthogonal to a rotational direction of the disc in accordance with the sinusoidal wave signal, and means for changing a data address at which reading out of the data from the data storing means is started for adjusting a phase of the sinusoidal wave signal obtained from the data read out from the data storing means so that the number of tracks of traverse by the light spot decreases to a minimum value;

whereby the controlling means is responsive to the sinusoidal wave signal of the adjusted phase for controlling positioning of the light spot.

2. An optical information reproducing apparatus according to claim 1, further comprising tracking error signal generation means for generating a tracking control signal, and means for adding the tracking control signal to the sinusoidal wave signal of the adjusted phase, whereby the controlling means is responsive to the added signal for controlling the position of the light spot.

* * * * *